US009356965B2

(12) United States Patent
Kjeldaas

(10) Patent No.: US 9,356,965 B2
(45) Date of Patent: May 31, 2016

(54) METHOD AND SYSTEM FOR PROVIDING TRANSPARENT TRUSTED COMPUTING

(71) Applicant: Alexander Kjeldaas, Saltsjö-Boo (SE)

(72) Inventor: Alexander Kjeldaas, Saltsjö-Boo (SE)

( * ) Notice: Subject to any disclaimer, the term of this patent is extended or adjusted under 35 U.S.C. 154(b) by 334 days.

(21) Appl. No.: 14/143,692

(22) Filed: Dec. 30, 2013

(65) Prior Publication Data

US 2015/0188945 A1 Jul. 2, 2015

(51) Int. Cl.
| | |
|---|---|
| *H04L 9/00* | (2006.01) |
| *H04L 29/06* | (2006.01) |
| *H04L 29/08* | (2006.01) |
| *G06F 21/64* | (2013.01) |
| *G06F 9/44* | (2006.01) |
| *G06F 21/62* | (2013.01) |

(52) U.S. Cl.
CPC ......... *H04L 63/20* (2013.01); *G06F 8/71* (2013.01); *G06F 21/6245* (2013.01); *G06F 21/64* (2013.01); *H04L 67/10* (2013.01)

(58) Field of Classification Search
USPC ............... 713/189; 707/609; 726/1; 370/256
See application file for complete search history.

(56) References Cited

U.S. PATENT DOCUMENTS

| | | | | |
|---|---|---|---|---|
| 2009/0037456 A1* | 2/2009 | Kirshenbaum | ... | G06F 17/30097 |
| 2010/0110935 A1* | 5/2010 | Tamassia | ................ | H04L 63/12 370/256 |
| 2011/0173455 A1* | 7/2011 | Spalka | ................ | G06F 21/6254 713/189 |
| 2011/0225429 A1* | 9/2011 | Papamanthou | ......... | G06F 21/64 713/189 |
| 2011/0231362 A1* | 9/2011 | Attarde | ............... | G06F 11/3442 707/609 |
| 2012/0209886 A1* | 8/2012 | Henderson | ........ | G06F 17/30557 707/798 |
| 2012/0278634 A1* | 11/2012 | Luukkala | ............ | H04L 63/0442 713/189 |
| 2015/0324499 A1* | 11/2015 | Zhou | .................... | G06F 17/5009 703/2 |

OTHER PUBLICATIONS

Coker, George, et al., "Principles of Remote Attestation,".
http://eagain.net/articles/git-for-computer-scientists/ , Sep. 18, 2013.
http://git-scm.com/book/en/git-branching-what-a-branch-is, Sep. 19, 2013.
Krautheim, F. John, "Private Virtual Infrastructure for Cloud Computing," University of Maryland, Baltimore County, 1000 Hilltop Circle, Baltimore, MD 21250, john.krautheim@umbc.edu, https://www.usenix.org/legacy/event/hotcloud09/tech/full_papers/krautheim.pdf.
Miller, Andrew, et al., "Authenticated Data Structures, Generically," http://www.cs.umd.edu/~mwh/papers/gpads.pdf.
NixOS, https://nixos.org/nixos/ .

(Continued)

*Primary Examiner* — Joseph P Hirl
*Assistant Examiner* — Sayed Beheshti Shirazi
(74) *Attorney, Agent, or Firm* — Morgan, Lewis & Bockius LLP

(57) ABSTRACT

A method performed at an electronic device with one or more processors and memory includes obtaining a public record including a plurality of commit nodes, where a respective commit node of the plurality of commit nodes includes: (i) a set of blobs corresponding to a collection of data; (ii) at least one cryptographic hash of one of the set of blobs; and (iii) at least one additional cryptographic hash of a parent node. The method includes: caching the public record; and obtaining, at a time after the obtaining, information corresponding to a new commit node, where the new commit node: includes a cryptographic hash of a parent node; and is associated with an updated collection of data. The method includes validating the new commit node; and in accordance with a determination that the new commit node is valid, updates the cached public record to include the new commit node.

16 Claims, 8 Drawing Sheets

(56) References Cited

OTHER PUBLICATIONS

Page, Thomas, "The Application of Hash Chains and Hash Structures to Cryptography," Technical Report, RHUL-MA-2009-18, Aug. 4, 2009, A thesis submitted for the degree of Doctor of Philosophy, Royal Holloway, University of London, Jul. 27, 2009, http://ma.rhul.ac.uk/static/techrep/2009/RHUL-MA-2009-18.pdf.

Rocha, Francisco, et al., "Lucy in the Sky *Without* Diamonds: Stealing Confidential Data in the Cloud," In Proceedings of the 1st International Workshop on Dependability of Clouds, Data Centers and Virtual Computing Environments (DCDV, with DS'11), Hong Kong, Jun. 2011, http://gsd.inesc-id.pt/~mpc/pubs/diamonds-final.pdf.

Santos, Nuno, et al., "Towards Trusted Cloud Computing," http://www.mpi-sws.org/~gummadi/papers/trusted_cloud.pdf.

Wikipedia, The Free Encylopedia, Merkle Tree, http://en.wikipedia.org/wiki/Merkle_tree.

\* cited by examiner

| Commit Node 210 | |
|---|---|
| Supersedes link(s) 212 | Parent A: 0x..... |
| | ••• |
| | Parent N: 0x..... |
| Composed of link(s) 214 | Content A: 0x..... |
| | ••• |
| | Content M: 0x..... |
| Comment(s) 216 (Optional) | Author Information |
| | Digital Signature |
| | Third Party Signature(s) |
| | ••• |

Figure 2A

| Data-only Node 220 | |
|---|---|
| Composed of link(s) 222 | Content A: 0x..... |
| | ••• |
| | Content M: 0x..... |

Figure 2B

METHOD AND SYSTEM FOR PROVIDING TRANSPARENT TRUSTED COMPUTING

TECHNICAL FIELD

The disclosed embodiments relate generally to Internet security, and in particular, to providing transparent trusted computing.

BACKGROUND

Cloud computing security is often based on ad-hoc security systems that fail to properly protect private user information against cloud infrastructure owners. Current systems also fail to properly protect private user information against service providers that run their service on cloud infrastructure. As such, the current state of cloud computing security poses a major issue to Internet commerce. Thus, a method and system for providing cloud computing security is desired.

SUMMARY

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to provide transparent trusted computing via a cryptographically secure data structure—called the public record. In some embodiments, the public record is an unforgeable, distributed, and immutable data structure including a plurality of nodes forming a directed acyclic graph. For example, the public record includes versions of a secure email system or sets of public keys to websites. In one aspect, any party is able to force another party to update their view of the public record as long as the update follows a set of global rules and proof is provided to validate the update. Parties, including trusted computers, must take into consideration all new information or updates to the public record. Thus, a surgical attack on one party by a malicious entity would not work and, instead, the malicious entity must fool or attack all parties adhering to the public record.

More specifically, some embodiments include a method of providing transparent trusted computing. In some embodiments, the method is performed at an electronic device with one or more processors and memory. The method includes obtaining a portion of a public record that includes a plurality of nodes in a directed-acyclic graph, the plurality of nodes include a plurality of commit nodes, where a respective commit node of the plurality of commit nodes includes: (i) a set of blobs corresponding to a collection of data; (ii) at least one representation of a cryptographic hash of one of the set of blobs; and (iii) at least one additional representation of a cryptographic hash of a parent node. The method also includes: caching one or more nodes of the portion of the public record; and obtaining, at a time after obtaining the portion of the public record, information corresponding to a new commit node, where: the new commit node includes at least one representation of a cryptographic hash of a parent node of the new commit node; and the new commit node is associated with an updated collection of data. The method further includes: validating the new commit node; and in accordance with a determination that the new commit node is valid, updating the cached portion of the public record to include the new commit node.

In some embodiments, an electronic device (e.g., computing device 108 or trusted computer 112, FIG. 1) includes one or more processors and memory storing one or more programs for execution by the one or more processors. The one or more programs include instructions for performing the operations of any of the methods described herein. In some embodiments, a non-transitory computer readable storage medium storing one or more programs, the one or more programs comprising instructions, which, when executed by an electronic device (e.g., computing device 108 or trusted computer 112, FIG. 1) with one or more processors, cause the electronic device to perform the operations of any of the methods described herein.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

FIG. 2A is a block diagram illustrating an implementation of a data structure for a commit node in the public record in accordance with some embodiments.

FIG. 2B is a block diagram illustrating an implementation of a data structure for a data-only node in the public record in accordance with some embodiments.

Figure 1:
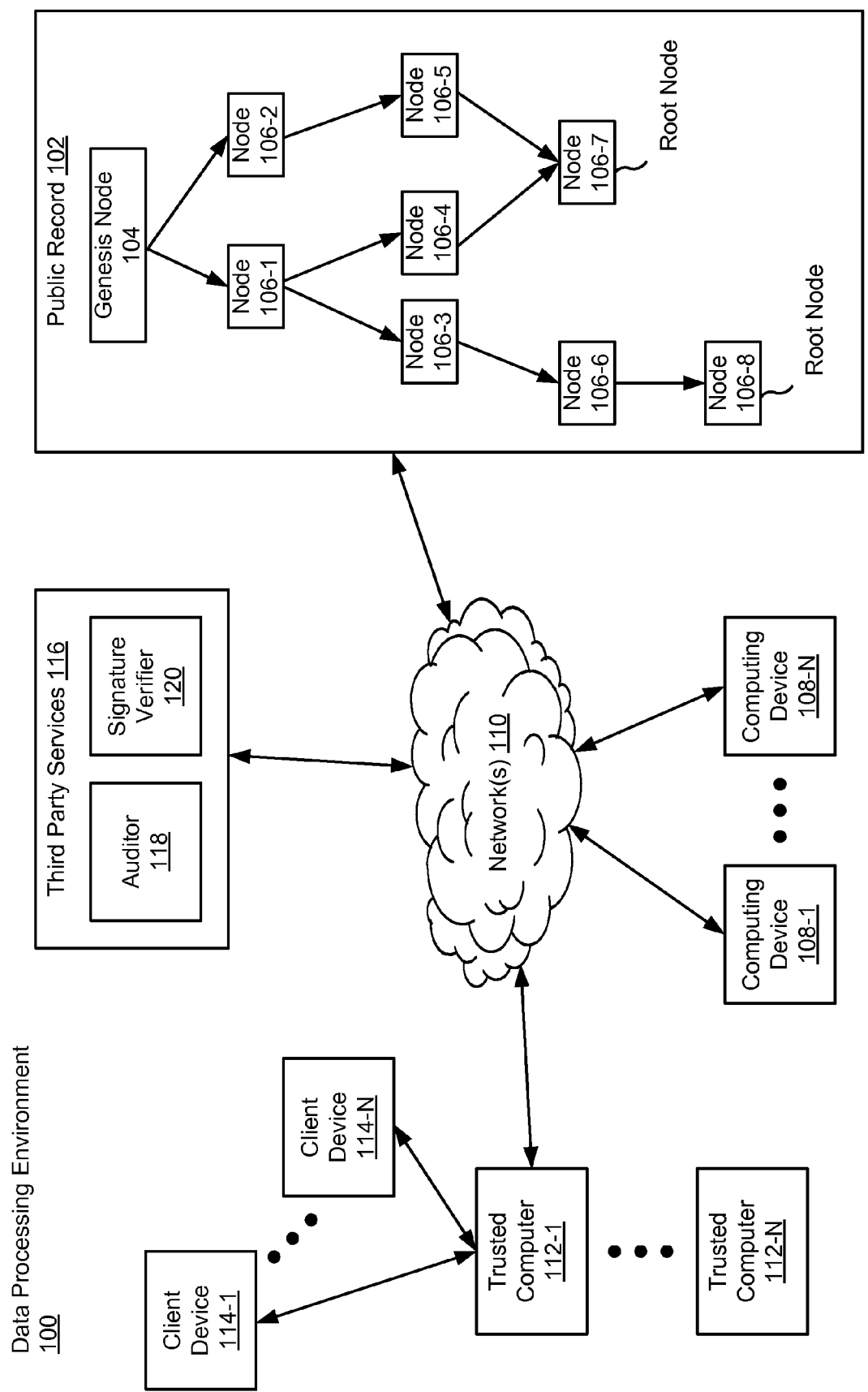
FIG. 1 is a block diagram illustrating an implementation of a data processing environment in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described herein in order to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

FIG. 1 is a block diagram illustrating an implementation of a data processing environment 100 in accordance with some embodiments. While some example features are illustrated, various other features have not been illustrated for the sake of brevity and so as not to obscure more pertinent aspects of the example implementations disclosed herein. To that end, as a non-limiting example, data processing environment 100 includes a public record 102, one or more computing devices 108, one or more networks 110, one or more trusted computers 112, and optional third party services 116.

In some embodiments, public record 102 is data structure that is distributed, unforgeable, and immutable. In some embodiments, public record 102 (or a portion thereof) is distributed amongst a plurality of parties in data processing environment 100. The parties in data processing environment 100 are each enabled to perform operations on the public record (e.g., adding nodes or performing a query).

In some embodiments, public record 102 includes a plurality of nodes that form a directed-acyclic graph. In some embodiments, public record 102 includes a genesis node 104 and a plurality of nodes 106. Each of the nodes in public record 102 is associated with a set of blobs or objects (not shown in FIG. 1) corresponding to a collection of data or data items. In some embodiments, genesis node 104 includes an original collection of data (e.g., an original version of software) and nodes 106 include modified collections of data derived from the original collection of data (e.g., later versions of the software). For example, nodes 106-1 and 106-2 are branches of genesis node 104 that correspond to changes to the original of the collection of data. As such, public record 102 includes all the changes to the original collection of data.

Public record 102 is unforgeable because each of nodes 106 include one or more cryptographically secure links to its corresponding collection of data (e.g., a SHA-1 or SHA-2 hash of the contents of the node) rather than a simple pointer to the collection of data. In some embodiments, public record 102 holds code and data that is too important to be controlled by a single party. For example, for a secure email service, the public record includes code, data, and configuration information necessary to run the service securely. In another example, the public record includes public keys for websites and modifications to the public record include revocation or addition of public keys.

In some embodiments, public record 102 includes one or more root nodes representing the most recently updated collection of data. For example, nodes 106-7 and 106-8 are root nodes that represent the most recently updated collection of data in their respective branches of the public record. In some embodiments, branches of public record 102 are merged according to practices well known in the art. For example, nodes 106-4 and 106-5 are merged to form node 106-7. Each node in the plurality of nodes 106 forming public record 102 are independently one of two node classes: (i) a commit node 210 and (ii) a data-only node 220. See the description of FIG. 2A for a more detailed explanation of a representative commit node 210 class. See the description of FIG. 2B for a more detailed explanation of a representative data-only node 220 class.

In some embodiments, a node is associated with a collection of data items that includes verification meta-data that expresses the extent to which the ancestor directed-acyclic graph has been verified to contain certain data items. In some embodiments, this verification meta-data expresses in which ancestor commit nodes data items have been modified, not modified, or which ancestor commit node last modified a data item. In some embodiments, the verification meta-data expresses the contents of ancestor's verification meta-data. In some embodiments, this verification meta-data is arranged in a tree that expresses the sets of ancestor nodes that affects a query on the public record. In some embodiments, this verification meta-data is arranged in a hierarchy of rank/select bit-vectors that expresses the sets of ancestor nodes that affects a query on the public record. The wavelet tree and the wavelet matrix are examples of hierarchies of rank/select bit-vectors.

In some embodiments, verification meta-data is used to assume that a commit node is verified without actually verifying it. In some embodiments, this meta-data is used to quickly locate the commit node that last modified a data item so as to either verify the signature of the commit node or to lookup other data items associated with the first data item. For example, node 106-6 has meta-data indicating that node 106-3 does not change associated data items 1 . . . 5. In some embodiments, this means that the changes introduced by node 106-3 need not be verified when node 106-6 is queried for associated data items 1 . . . 5. In some embodiments, this means that a user of the public record would consider a proof that node 106-3 did in fact modify data item 3 to be an invalid proof. In some embodiments, this means that the user would consider the same proof an invalidation of node 106-6 because it contained invalid meta-data.

In some embodiments, a respective computing device 108 is configured to obtain public record 102 from another computing device 108 or one of trusted computers 112 and perform queries on public record 102. In some embodiments, the respective computing device 108 is also configured to communicate its version of public record 102 (e.g., with additional nodes) to a second computing device 108, which in turn forces the second computing device 108 to update its version of the public record as long as the additional nodes in the respective computing device's version of the public record follow a set of global rules for the public record and the additional nodes can be validated.

Examples of computing devices 108 include, but are not limited to, a server system, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

Examples of one or more networks 110 include local area networks ("LAN") and wide area networks ("WAN") such as the Internet. Communication network(s) 110 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi Fi, voice over Internet Protocol (VoIP), Wi-MAX, or any other suitable communication protocol.

In some embodiments, trusted computer 112-1 is a representative trusted computer that is associated with one or more client devices 114 (e.g., client device 114-1 through 114-N) and provides services or functionalities to the one or more associated client devices 114. For example, trusted computer 112-1 is a cloud computing service provider that provides a secure email service to client devices 114 that is provided in public record 102. In some embodiments, trusted computer 112-1 stores private user information for users of client devices 114.

In some embodiments, one or more third party services 116 perform maintenance and security checks on public record 102 to ensure the integrity and security of public record 102. In some embodiments, auditor 118 is configured to ensure that new nodes (and their contents) follow a global set of rules for public record 102. For example, auditor 118 ensures that the modifications do not introduce corruptions or back doors into public record 102. Auditor 118 or another third party service 116 signs nodes indicating that all nodes validate all nodes above it up to the genesis node in the public have been checked and are valid. Thus, for example, an electronic device need not validate nodes from a new node to the genesis node of the public record but only from the new node to the signed node indicating that all other nodes above it have already been validated. In some embodiments, auditor 118 does not validate all nodes, but a subset, and the auditor adds verification meta-data to the public record indicating what type of verification has been done. In some embodiments, auditor 118 adds verification meta-data which aggregates the verification meta-data of other commit nodes.

In some embodiments, signature verifier 120 is configured to ensure that authors' signatures are valid and, in some circumstances, that new nodes with critical changes are signed with signatures from one or more proper authorities. In some embodiments, new nodes are signed by the author or developer of the node (e.g., with a digital signature). In some embodiments, new nodes introducing critical changes are signed by one or more of the proper authorities (e.g., multiple signatures are required to add/revoke a public key for a website).

FIG. 2A is a block diagram of a data structure corresponding to a representative commit node 210 class in accordance with some embodiments. Commit node 210 includes two or more cryptographically secure links. Commit node 210 includes one or more supersedes cryptographic hash-links 212 (sometimes called "supersedes links" or "parent links") to the parent nodes(s) of commit node 210. Commit node 210 also includes one or more composed of cryptographic hash-links 214 (sometimes called "composed of links" or "data links") to the contents of commit node 210 (e.g., a set of blobs corresponding to a collection of data).

In some embodiments, supersedes link(s) 212 are links to the parent node(s) of commit node 210. Each commit node has one parent node and, in some embodiments, commit nodes have two or more parent nodes. In some embodiments, a parent node is an ancestor of another parent node. Supersedes link(s) 212 create a happened-before/happened-after relationship between commit node 210 and its parent node(s) because a respective supersedes link 212 is a hash value of a representation of a parent node. Supersedes link(s) 212 provide commit nodes 210 with a temporal dimension which provides a versioning history for public record 102 and also serves to make public record 102 both immutable and persistent. For example, any node in public record 102 can be modified but the modification creates a new node whose parent is the node(s) from which it is derived.

In some embodiments, composed of link(s) 214 are link(s) to the collection of data corresponding to commit node 210. In some embodiments, composed of link(s) 214 include hash values of representations of the contents of commit node 210. See the description of FIG. 5A for a more detailed explanation of this embodiment. In some embodiments, composed of link(s) 214 include a single link to a directory structure that includes hash values of representations of the contents of commit node 210. In some embodiments, composed of link(s) 214 includes a single checksum of the collection of data corresponding to commit node 210 (e.g., the contents of commit node 210). See the description of FIG. 5B for a more detailed explanation of this embodiment. In some embodiments, the single checksum is the checksum of modifications (additions and deletions) to parents.

In some embodiments, commit node 210 optionally includes comment(s) 216 with information corresponding to commit node 210. In some embodiments, comment(s) 216 include information indicating the author of commit node 210, the signature of the author of commit node 210, and/or one or more signatures of third parties verifying commit node 210. For example, the third party verifies the contents of commit node 210 (e.g., no malicious code is included in the contents of commit node 210). In another example, the third party verifies that the author was authorized to submit commit node 210 to public record 102 (e.g., the author of commit node 210 is authorized to make modification). In yet another example, the third party verifies that commit node 210 follows a set of global rules for public record 102.

FIG. 2B is a block diagram of a data structure corresponding to a data-only node 220 class in accordance with some embodiments. Data-only node 220 includes one or more cryptographically secure links. Data-only node 220 includes one or more composed of cryptographic hash-links 222 (sometimes called "composed of links" or "data links") to the contents of data-only node 220 (e.g., one or more blobs corresponding to a collection of data). In some embodiments, composed of link(s) 222 are hash values of representations of the contents of data-only node 220. In some embodiments, composed of link(s) 222 include a single link to a directory structure that includes hash values of representations of the contents of data-only node 220. In some embodiments, composed of link(s) 222 include a single checksum of the collection of data corresponding to data-only node 220 (e.g., the contents of data-only node 220). In some embodiments, the collection of data represented by the composed of link(s) 222 are merged with the corresponding links in parents, forming the full collection of data.

Figure 3:
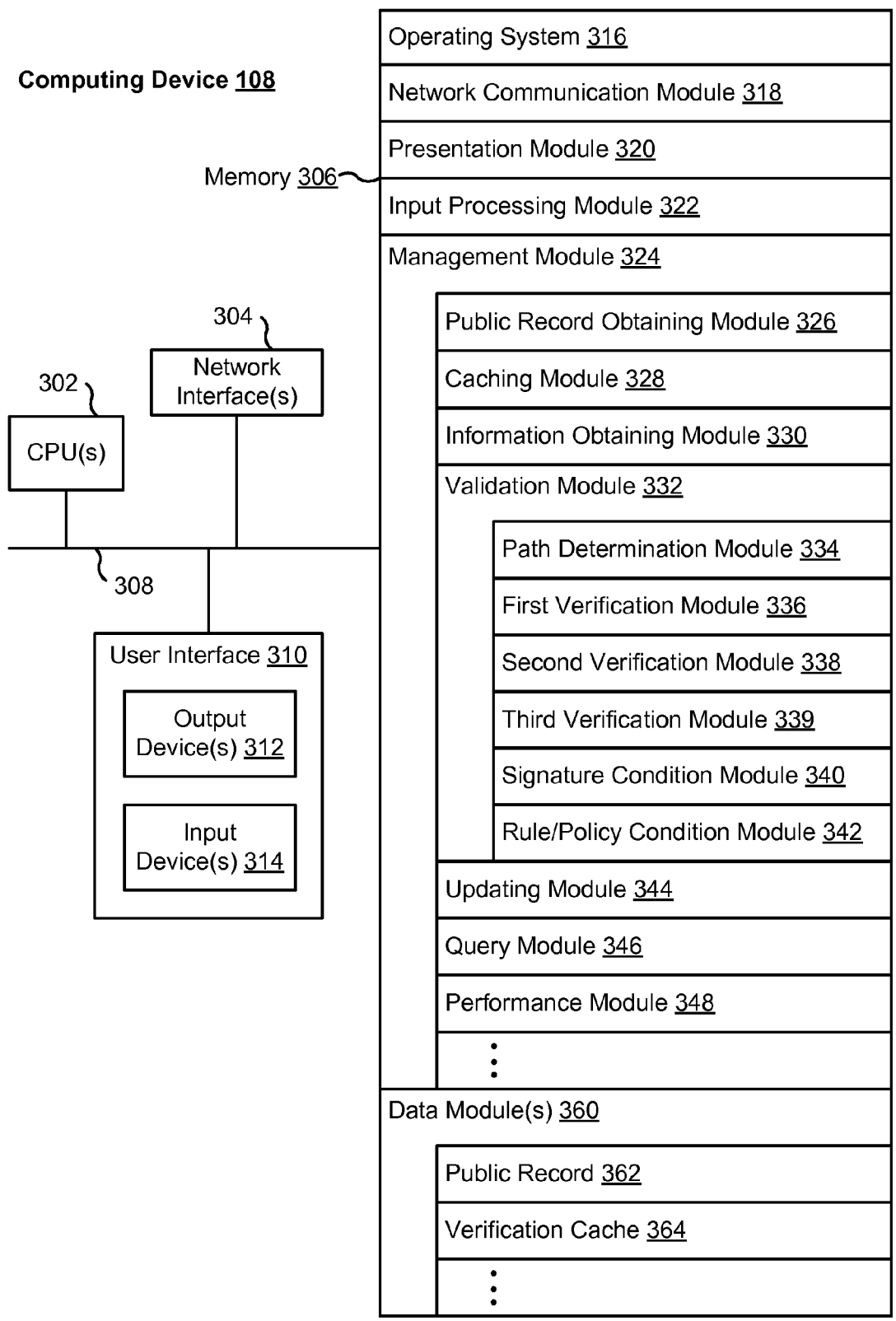
FIG. 3 is a block diagram of a computing device in accordance with some embodiments.

FIG. 3 is a block diagram illustrating a representative computing device 108 in accordance with some embodiments. For example, computing device 108 is a standalone server system or an electronic device associated with a user. Computing device 108, typically, includes one or more processing units (CPUs) 302, one or more network interfaces 304, memory 306, and one or more communication buses 308 for interconnecting these components (sometimes called a chipset). Computing device 108 also includes a user interface 310. User interface 310 includes one or more output devices 312 that enable presentation of media content, including one or more speakers and/or one or more visual displays. User interface 310 also includes one or more input devices 314, including user interface components that facilitate user input such as a keyboard, a mouse, a voice-command input unit or microphone, a touch screen display, a touch-sensitive input pad, a gesture capturing camera, or other input buttons or controls. Memory 306 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 306, optionally, includes one or more storage devices remotely located from CPU(s) 302. Memory 306, or alternately the non-volatile memory device(s) within memory 306, includes a non-transitory computer readable storage medium. In some implementations, memory 306, or the non-transitory computer readable storage medium of memory 306, stores the following programs, modules, and data structures, or a subset or superset thereof:

- an operating system 316 including procedures for handling various basic system services and for performing hardware dependent tasks;
- a network communication module 318 for connecting computing device 108 to other computers (e.g., other computing devices 108 or a respective trusted computer 112, FIG. 1) connected to one or more networks 110 via one or more communication network interfaces 304 (wired or wireless);
- a presentation module 320 for enabling presentation of information (e.g., a user interface for a web page or an application program, a game, audio and/or video content, text, etc.) at computing device 108 via one or more output devices 312 (e.g., displays, speakers, etc.) associated with user interface 310; and
- an input processing module 322 for detecting one or more user inputs or interactions from one of the one or more input devices 314 and interpreting the detected input or interaction;
- management module 324 for providing and managing a public record, including but not limited to:
  - a public record obtaining module 326 for obtaining a portion of a public record that includes a plurality of nodes in a directed-acyclic graph, the plurality of nodes include a plurality of commit nodes;
  - a caching module 328 for caching the portion of the public record in public record 362;
  - an information obtaining module 330 for obtaining information corresponding to a new commit node (e.g., from other computing devices 108, FIG. 1) associated with an updated collection of data;
  - a validation module 332 for validating the new commit node, including but not limited to:
    - a path determination module 334 for determining a path (sometimes called an "authentication path") from the new commit node to a node in public record 362 (e.g., the cached portion of the public record) for one or more queries;
    - a first verification module 336 for verifying the composed of link(s) of each node, excluding the cached node, in the authentication path;
    - a second verification module 338 for verifying the supersedes link(s) of the new commit node;
    - optionally, a third verification module 339 for verifying the meta-data of nodes in the authentication path;
    - optionally, a signature condition module 340 for verifying that the new commit node satisfies a signature condition; and
    - optionally, a rule/policy condition module 342 for verifying that the new commit node satisfies a set of global rules associated with the public record and a set of private polices associated with a user of computing device 108;
  - an updating module 344 for updating public record 362 (e.g., the cached portion of the public record) to include the new commit node after the new commit node is validated;
  - optionally, a query module 346 for performing a query over the updated collection of data associated with the new commit node;
  - optionally, a performance module 348 for performing an operation or causing an operation to be performed based on the result of the query; and
- one or more data modules 360 corresponding to the computing device 108, including but not limited to:
  - a cached public record 362 (or a portion thereof); and
  - optionally, a verification cache 364 storing an indicator of what verification has been performed.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above. In some embodiments, the modules, and data structures stored in memory 306, or the computer readable storage medium of memory 306, provide instructions for implementing any of the methods described below with reference to FIGS. 7A-7B.

Figure 4:
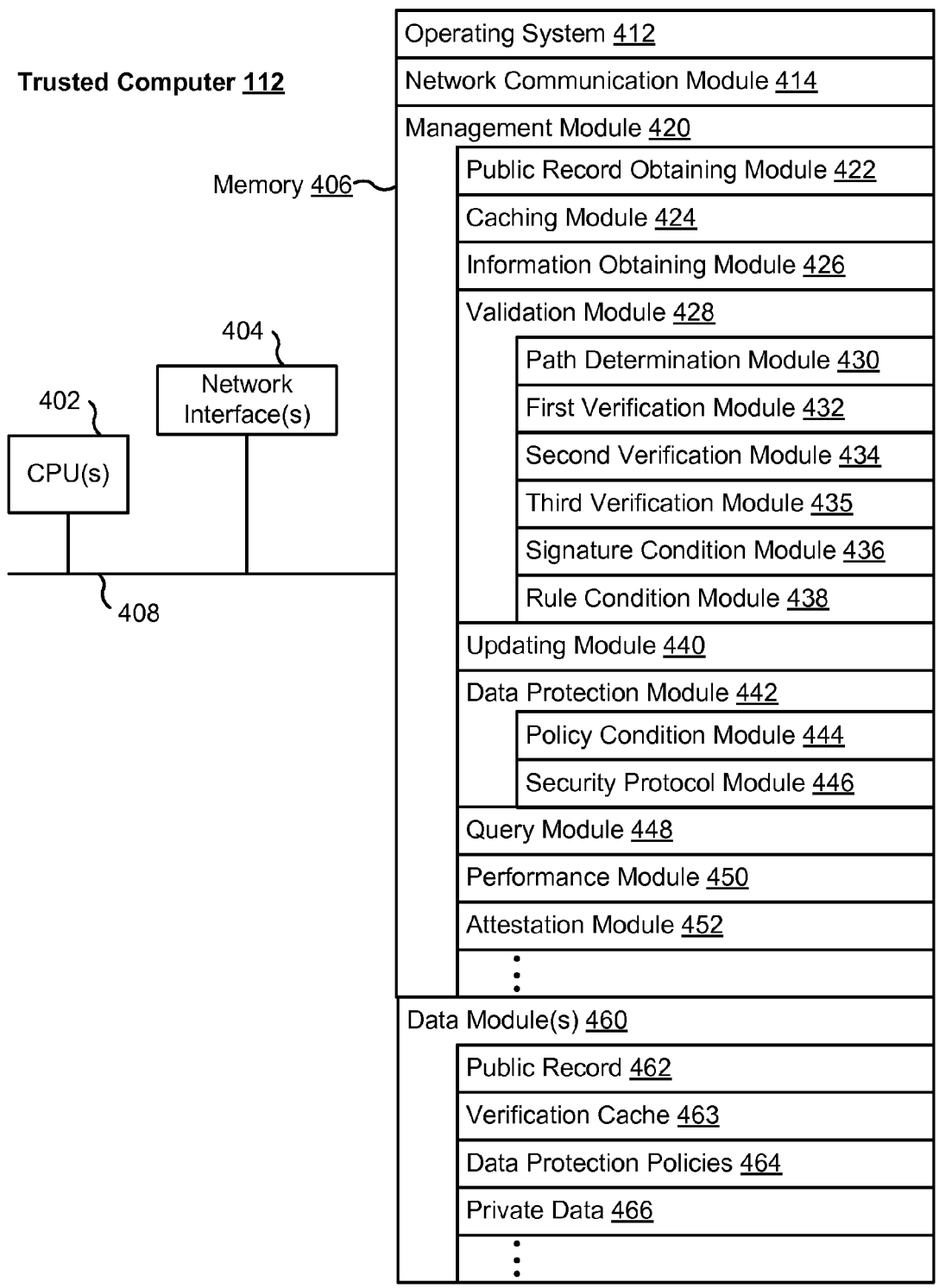
FIG. 4 is a block diagram of a trusted computer in accordance with some embodiments.

FIG. 4 is a block diagram illustrating a representative trusted computer 112 (e.g., a cloud computing service provider associated with one or more client devices 114) in accordance with some embodiments. As will be appreciated by one in the art, trusted computer 112 and computing device 108 shown in FIG. 3 include a plurality of similar modules performing similar functions. However, trusted computer 112 further includes a data protection module and an attestation module for performing operations for performing operations to secure private data according to data protection policies for the one or more client devices 114 associated with trusted computer 114.

In FIG. 4, Trusted computer 112, typically, includes one or more processing units (CPUs) 402, one or more network interfaces 404, memory 406, and one or more communication buses 408 for interconnecting these components (sometimes called a chipset). Memory 406 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 406, optionally, includes one or more storage devices remotely located from the CPU(s) 402. Memory 406, or alternately the non-volatile memory device(s) within memory 406, includes a non-transitory computer readable storage medium. In some implementations, memory 406, or the non-transitory computer readable storage medium of memory 406, stores the following programs, modules, and data structures, or a subset or superset hereof:

- an operating system 412 including procedures for handling various basic system services and for performing hardware dependent tasks;
- a network communication module 414 that is used for connecting trusted computer 112 to other computing devices (e.g., client devices 114 associated with trusted computer 112 or computing devices 108, FIG. 1) connected to one or more networks 110 via one or more network interfaces 404 (wired or wireless);
- management module 420 for providing transparent trusted computing, including but not limited to:
  - a public record obtaining module 422 for obtaining a portion of a public record that includes a plurality of nodes in a directed-acyclic graph, the plurality of nodes include a plurality of commit nodes;

a caching module 424 for caching the portion of the public record in public record 462;

an information obtaining module 426 for obtaining information corresponding to a new commit node (e.g., from computing devices 108, FIG. 1) associated with an updated collection of data;

a validation module 428 for validating the new commit node, including but not limited to:
  a path determination module 430 for determining an authentication path from the new commit node to a node in public record 462 (e.g., the cached portion of the public record) for one or more queries;
  a first verification module 432 for verifying the composed of link(s) of each node, excluding the cached node, in the authentication path;
  a second verification module 434 for verifying the supersedes link(s) of the new commit node;
  optionally, a third verification module 435 for verifying the meta-data of nodes in the authentication path;
  optionally, a signature condition module 436 for verifying that the new commit node satisfies a signature condition; and
  optionally, a rule condition module 438 for verifying that the new commit node satisfies a set of global rules associated with the public record;

an updating module 440 for updating public record 462 (e.g., the cached portion of the public record) to include the new commit node after the new commit node is validated;

a data protection module 442 for protecting private data 466 associated with client devices 114, including but not limited to:
  a policy condition module 444 for determining whether the updated collection of data associated with the new commit node satisfies a set of data protection policies associated with a respective client device 114; and
  a security protocol module 446 for performing a security protocol as to private data 466 (e.g., deleting private data 466 or spreading a secret key, such as a user's private crypto key, to encrypted private data 466 to one or more other trusted computers 112) when the updated collection of data associated with the new commit node does not satisfy the data protection policies associated with the respective client device 114;

optionally, a query module 448 for performing a query over the updated collection of data associated with the new commit node;

optionally, a performance module 450 for performing an operation or causing an operation to be performed based on the result of the query; and optionally, an attestation module 452 for responding to a remote attestation request from one of client device 114;

one or more data modules 460 corresponding to trusted computer 112, including but not limited to:
  a cached public record 462 (or a portion thereof);
  optionally, a verification cache 463 storing an indicator of what verification has been performed;
  data protection policies 464 associated with each of client devices 114; and
  private data associated with client devices 114.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 406, optionally, stores a subset of the modules and data structures identified above. Furthermore, memory 406, optionally, stores additional modules and data structures not described above. In some embodiments, the modules, and data structures stored in memory 406, or the computer readable storage medium of memory 406, provide instructions for implementing any of the methods described below with reference to FIGS. 7A-7B.

Although FIGS. 3-4 show representative computing device 108 and representative trusted computer 112, respectively, FIGS. 3-4 are intended more as functional description of the various features which may be present in a set of servers than as a structural schematic of the implementations described herein. In practice, and as recognized by those of ordinary skill in the art, items shown separately could be combined and some items could be separated. For example, some items shown separately in FIGS. 3-4 could be implemented on a single computing device and single items could be implemented by one or more computing devices. For example, the actual number of servers used to implement trusted computer 112 and how features are allocated among them will vary from one implementation to another.

Figure 5A:
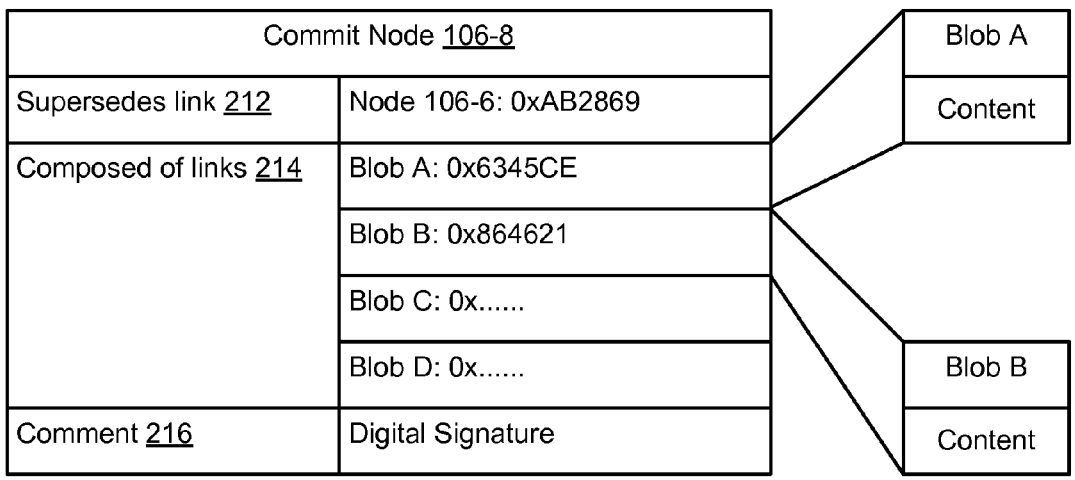
FIG. 5A is a block diagram illustrating an implementation of a data structure for a commit node in the public record in accordance with some embodiments.

FIG. 5A is a block diagram of a data structure of node 106-8 in public record 102, as shown in FIG. 1, in accordance with some embodiments. In FIG. 5A, node 106-8 is a commit node that includes one supersedes link 212 to node 106-6 (e.g., the parent node of commit node 106-8), a plurality of composed of links 214 to the contents of commit node 106-8, and comment 216 including the digital signature of the author of commit node 106-8. In FIG. 5A, commit node 106-8 includes composed of links 214 to blob A, blob B, blob C, and blob D. Blobs A-D comprise a collection of data that form the contents of commit node 106-8. In FIG. 5A, commit node 106-8 includes a cryptographic hash-link or hash value for each of blobs A-D.

In one non-limiting example, commit node 106-8 is a new commit node in an authentication path, and computing device 108 or a component thereof (e.g., validation module 322, FIG. 3) is configured to validate commit node 106-8. In this example, validating commit node 106-8 includes verifying each composed of link 214 included in commit node 106-8. Thus, in order to validate commit node 106-8, computing device 108 or a component thereof (e.g., first verification module 336, FIG. 3) is configured to verify each composed of link 214 by running a hash algorithm on each of blobs A-D and comparing the results with the corresponding hash values in composed of links 214 in commit node 106-8. For example, if the hash value from running the hash algorithm on blob A does not match the hash value for blob A in composed of links 214, then commit node 106-8 is not verified. Thus, the contents of blobs A-D are required to fully verify composed of links 214 in commit node 106-8.

In another example, if the contents of blobs A-D are not available, or verification is configured to be done on-demand, then commit node 106-8 is marked as not verified in the verification cache 364.

In another example, commit node 106-8 is a new commit node in an authentication path, and computing device 108 or a component thereof (e.g. validation module 322, FIG. 3) is configured to validate commit node 106-8 for a query that returns blob B. In this case composed of links A, C, and D need not be verified, but link B must be verified. If the hash value from running the hash algorithm on blob B matches the value of blob B in the composed of links 214, then commit node 106-8 is verified for the given query. The link B can be marked as verified in verification cache 364 to avoid repeated verifications.

Figure 5B:
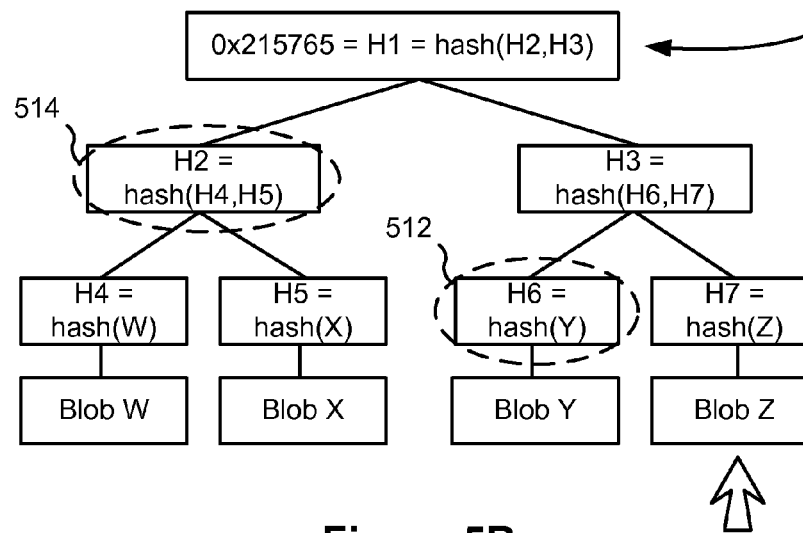
FIG. 5B is a block diagram illustrating an implementation of a data structure for a commit node in the public record in accordance with some embodiments.

FIG. 5B is a block diagram of a data structure of node 106-7 in public record 102, as shown in FIG. 1, in accordance with some embodiments. In FIG. 5B, node 106-7 is a commit node that includes two supersedes links 212 to nodes 106-4 and 106-5 (e.g., the parent nodes of commit node 106-7), one composed of link 214 to a checksum of the contents of commit node 106-7, and comment 216 including the digital signature of the author of commit node 106-7.

In FIG. 5B, the checksum of the contents of commit node 106-7 is the checksum of a binary tree representation of the contents of commit node 106-7. FIG. 5B includes binary tree representation 510 of the contents of commit node 106-7 including blob W, blob X, blob Y, and blob Z (e.g., corresponding to a collection of data). In FIG. 5B, the binary tree is optimally balanced.

For example, commit node 106-7 is a new commit node in an authentication path, computing device 108 or a component thereof (e.g., validation module 322, FIG. 3) is configured to validate commit node 106-7 during evaluation of a given query (e.g. query module 346, FIG. 3). In the example, commit node 106-7 is not previously fully verified, but is partially verified while evaluating the query. Validating commit node 106-7 for the query includes verifying composed of link 214 included in commit node 106-7. Thus, in order to validate commit node 106-7 for the query, computing device 108 or a component thereof (e.g., first verification module 336, FIG. 3) is configured to verify the checksum of an authentication path in binary tree representation 510 of the contents of commit node 106-7.

For example, evaluating the query requires verifying the contents and position of the 4$^{th}$ leaf, blob Z, in the binary tree. It is known that this is the result of the query. When starting with blob Z, verification module 336 is configured to verify the checksum in composed of link 214 by first running a hash algorithm on blob Z to generate hash value H7. Next, in this example, H7 is combined with its sibling node 512 (e.g., H6) using zero or more framing bits and, in turn, the hash algorithm is run on (H6, H7) to generate hash value H3. Next, in this example, H3 is combined with its sibling node 514 (e.g., H2) and, in turn, the hash algorithm is run on (H2, H3) to generate hash value H1. Continuing with this example, hash value H1 is compared with the checksum in composed of link 214 in commit node 106-7. For example, if H1 does not match the checksum in composed of links 214, then the contents and position of blob Z in commit node 106-7 is not verified. Thus, only the contents of blob Z and the checksums of one node per level of the binary tree representation are required to verify that blob Z is the result for the given query on commit node 106-7.

Figure 6:
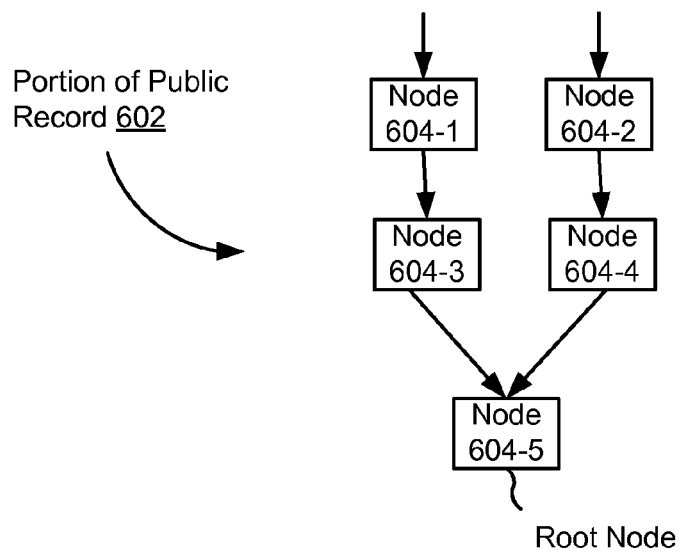
FIG. 6 is a block diagram of an updated public record in accordance with some embodiments.
Figure 6:
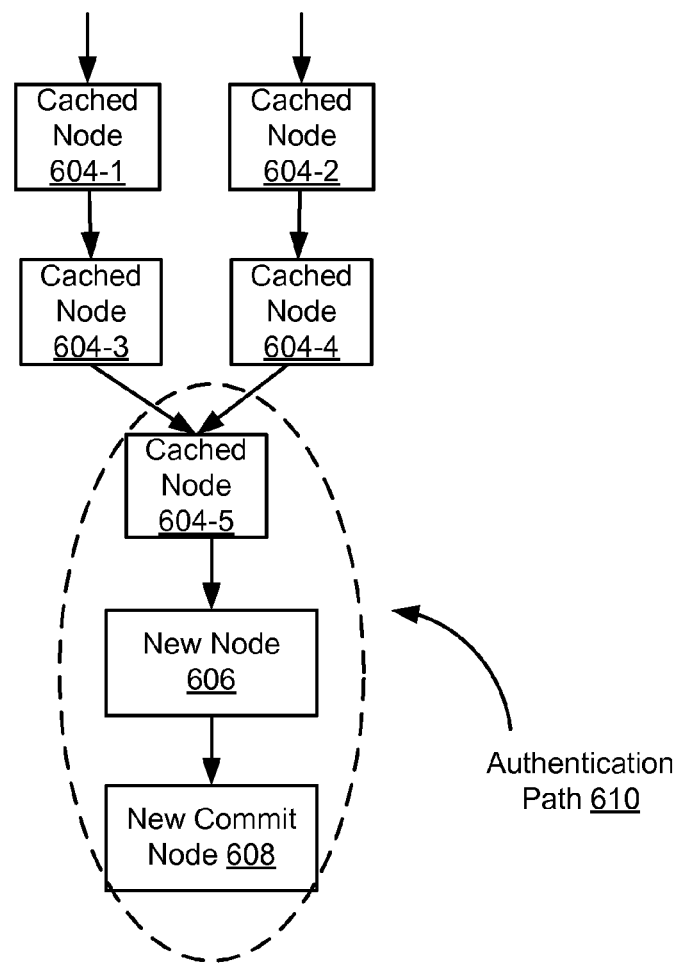

FIG. 6 includes block diagrams illustrating two versions or states of the public record in accordance with some embodiments. For example, computing device 108 or a component thereof (e.g., public record obtaining module 326, FIG. 3) obtains a portion of public record 602 including a plurality of nodes 604. Subsequently, computing device 108 or a component thereof (e.g., caching module 328, FIG. 3) caches the portion of public record 602.

For example, at a time after obtaining the portion of public record 602, computing device 108 or a component thereof (e.g., information obtaining module 326, FIG. 3) obtains information corresponding to new node 606 and new commit node 608 (e.g., the new root node). Next, in this example, computing device 108 or a component thereof (e.g., path determination module 326, FIG. 3) determines authentication path 610 from a cached node (e.g., root node 604-5 from the cached portion of public record 602) to new commit node 608.

In this example, computing device 108 or a component thereof (e.g., validation module 332, FIG. 3) validates new commit node 608, first, by verifying the composed of link(s) of new node 606 and new commit node 608 (e.g., with first verification module 336, FIG. 3) and, second, by verifying the supersedes link(s) of new commit node 608 (e.g., with second verification module 338, FIG. 3). Upon validating new commit node 608, computing device 108 or a component thereof (e.g., updating module 344, FIG. 3) updates cached portion of public record 602 to include new node 606 and new commit node 608.

In another example, the supersedes link of new commit node 606 is verified. Next the supersedes link of new commit node 608 is verified, but the composed of link(s) are left unverified and are verified when needed during query evaluation.

Figure 7A:
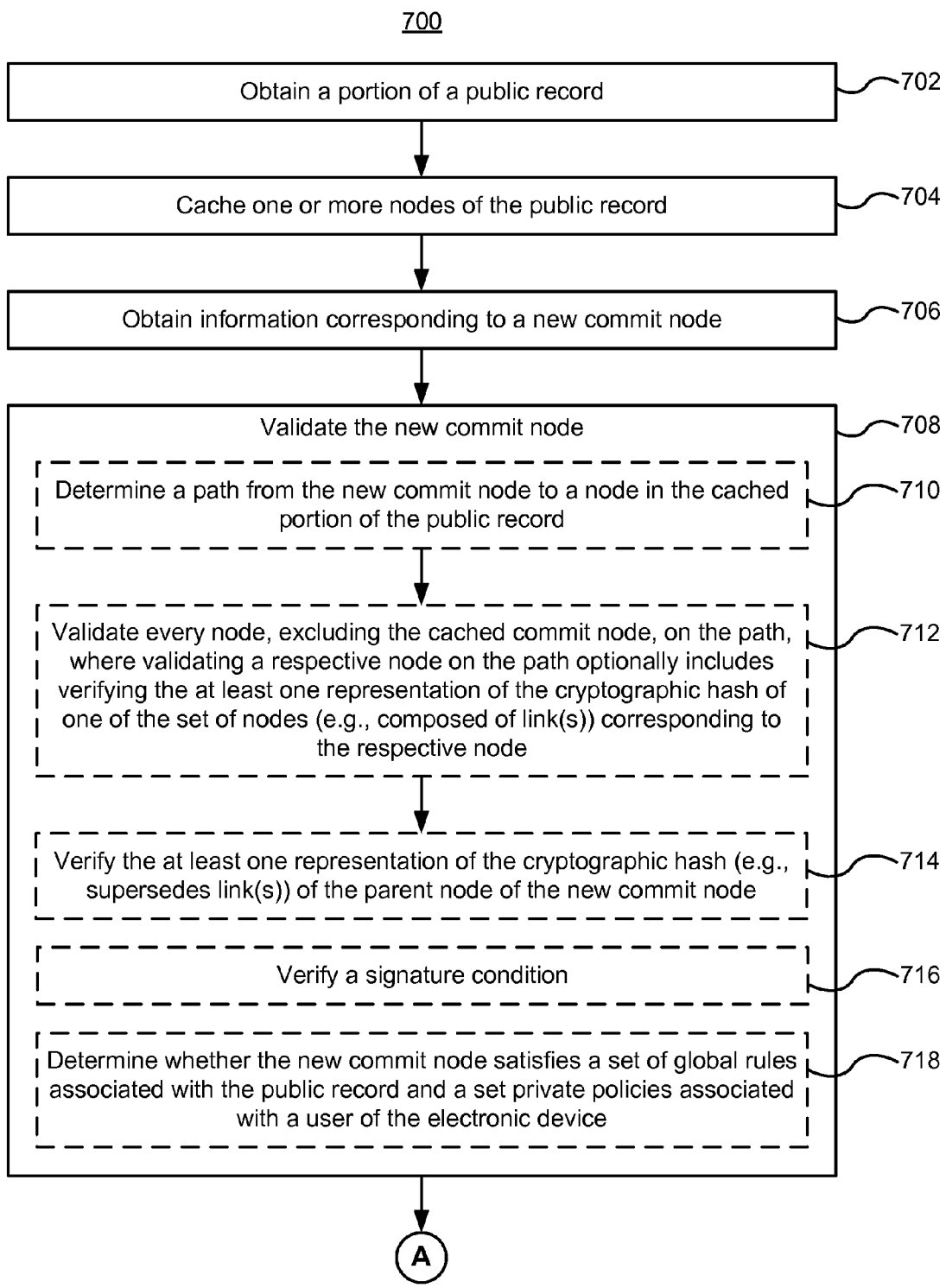
FIGS. 7A-7B illustrate a flowchart representation of a method of providing transparent trusted computing in accordance with some embodiments.
Figure 7B:
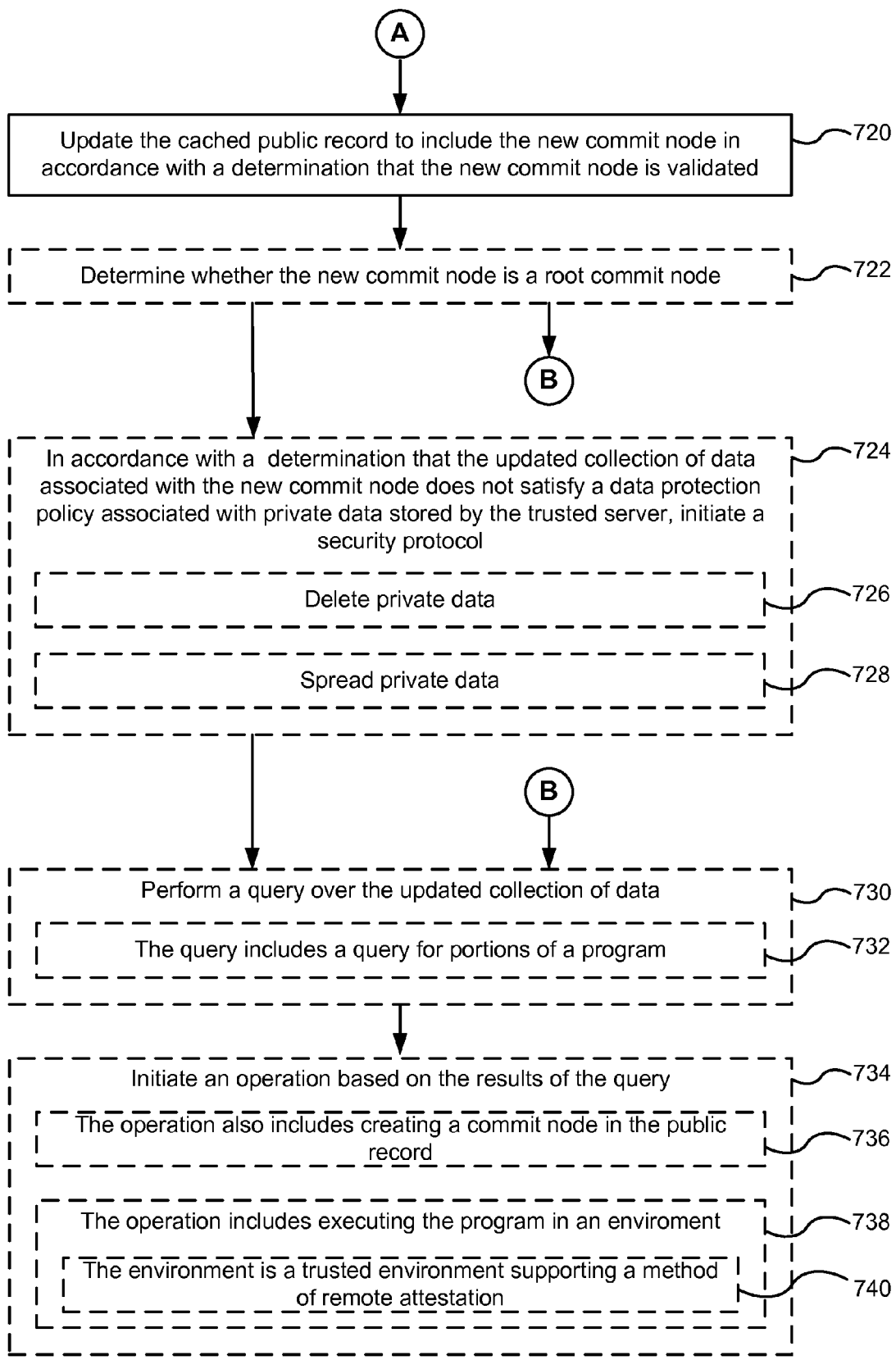

FIGS. 7A-7B illustrate a flowchart representation of a method 700 of providing transparent trusted computing in accordance with some embodiments. At least in some embodiments, method 700 is performed by an electronic device (e.g., computing device 108 or trusted computer 112, FIG. 1) with one or more processors and memory, or one or more components of the electronic device (e.g., management module 324, FIG. 3 or management module 420, FIG. 4). In some embodiments, method 700 is governed by instructions that are stored in a non-transitory computer readable storage medium and that are executed by one or more processors of an electronic device (e.g., processor(s) 302 of computing device 108, FIG. 3 or processor(s) 402 of trusted computer 112, FIG. 4).

The electronic device obtains (702) a portion of a public record. For example, the electronic device queries a server for a most current version of the public record (e.g., http://www.public_record.org). In another example, the electronic device receives a portion of the public record every time the electronic device communicates with a party in data processing environment 100, as shown in FIG. 1.

The public record includes a plurality of nodes in a directed-acyclic graph, the plurality of nodes include a plurality of commit nodes. For example, in FIG. 1, public record 102 forms a directed acyclic graph. Directed edges between nodes in public record 102 form vertices and the vertices do not form cycles. For example, in FIG. 1, nodes 106 in public record 102 include a plurality of commit nodes. In some embodiments, an edge of the directed-acyclic graph from a first node to a second node includes a representation of a cryptographic hash of the second node in a cryptographic hash of the first node.

In some embodiments, a respective commit node of the plurality of commit nodes includes (i) a set of blobs corresponding to a collection of data. For example, FIG. 5A shows commit node 106-8 associated with blobs A-D which form a collection of data. In some embodiments, the set of blobs are deconstructed into a binary tree representations (e.g., binary tree representation 510, FIG. 5B).

In some embodiments, a respective commit node of the plurality of commit nodes also includes (ii) at least one representation of a cryptographic hash of one of the set of blobs. For example, FIG. 5A shows commit node 106-8 with a plurality of composed of links 214 corresponding to blobs A-D. In this example, each of composed of links 214 is a cryptographic hash (or a representation thereof) of a respective blob. In another example, FIG. 5B shows commit node 106-7 with composed of link 214 corresponding to a checksum of a binary representation of blobs W-Z (e.g., binary tree representation 510) associated with commit node 106-7. In this example, composed of link 214 is a cryptographic hash (or a representation thereof) of a representation (e.g., a binary tree) of blobs W-Z associated with commit node 106-7.

In some embodiments, a respective commit node of the plurality of commit nodes further includes (iii) at least one additional representation of a cryptographic hash of a parent node. For example, FIG. 5A shows commit node 106-8 with supersedes link 212 to node 106-6 (e.g., the parent node of commit node 106-8). In this example, supersedes link 212 is a cryptographic hash (or a representation thereof) of parent node 106-6. In another example, FIG. 5B shows commit node 106-7 with supersedes links 212 to nodes 106-4 and 106-5 (e.g., the parent nodes of commit node 106-7). In this example, supersedes links 212 are cryptographic hashes (or a representations thereof) of parent nodes 106-4 and 106-5.

In some embodiments, one or more blobs in the set of blobs associated with a first commit node are also associated with a second commit node different from the first commit node. In some embodiments, one or more blobs in the set of blobs associated with the first commit node are data-only nodes included in the public record. Thus, in some embodiments, there is a shared substructure between commit nodes. For example, a tree of data or a blob associated with one commit node can also be linked to by another commit node. When the structure is shared, some verification can be skipped. For example verifying cryptographic hashes in the nodes is not needed if this has already been done.

In some embodiments, the plurality of nodes include in the directed-acyclic graph further includes one or more data-only nodes (e.g., data-only node 220, FIG. 2B). In some embodiments, a respective data-only node of the one or more data-only nodes includes (i) one or more blobs corresponding to a collection of data. In some embodiments, the respective data-only node includes (ii) at least one representation of a cryptographic hash of one of the one or more blobs (e.g., one or more composed of links). In some embodiments, the respective data-only node does not include (iii) not a representation of a cryptographic hash of a parent node (e.g., no parent links).

The electronic device caches (704) one or more nodes of the portion of the public record. In some embodiments, computing device 108 or a component thereof (e.g., caching module 328, FIG. 3) is configured to cache one or more nodes of the portion of the public record in public record 362. For example, caching module 328 caches one or more nodes of the portion of the public record from a root node to a signed node indicating that all nodes from the genesis node to the signed commit node have been previously validated to a certain extent (for example as stored in the validation cache 364). In some embodiments, trusted computer 112 or a component thereof (e.g., caching module 424, FIG. 4) is configured to cache one or more nodes of the portion of the public record in public record 462

The electronic device obtains (706) information corresponding to a new commit node that is associated with an updated collection of information. In some embodiments, computing device 108 or a component thereof (e.g., information obtaining module 330, FIG. 3) is configured to obtain information corresponding to a new commit node. In some embodiments, trusted computer 112 or a component thereof (e.g., information obtaining module 426, FIG. 4) is configured to obtain information corresponding to a new commit node.

In some embodiments, the new commit node includes at least one representation of a cryptographic hash of a parent node of the new commit node. For example, the new commit node includes one or more supersedes links to parent nodes. In some embodiments, the new commit node is associated with an updated collection of data. For example, the new commit node's collection of data is a modification of its parent node's collection of data. For example, the new commit node's collection of data omits or adds data in comparison to its parent node's collection of data.

In some embodiments, the electronic device and the other party providing the information corresponding to the new commit node determine what information or proof is required to validate the new commit node. For example, in order to fully validate commit node 106-8 in FIG. 5A, the electronic device needs to be provided with the contents of commit node 106-8 (e.g., the contents of blobs A-D) to validate composed of links 214 in commit node 106-8. In another example, in order to validate that blob Z is the 4th leaf in the binary tree attached to commit node 106-7 in FIG. 5B, the electronic device needs to be provided with the contents blob Z and the checksums (or hash values) of sibling nodes in binary tree representation 510 to validate composed of link 214 (e.g., the checksum of the contents of commit node 106-7) in commit node 106-7.

The electronic device validates (708) the new commit node. In some embodiments, computing device 108 or a component thereof (e.g., validation module 332, FIG. 3) is configured to validate the new commit node. In some embodiments, trusted computer 112 or a component thereof (e.g., validation module 428, FIG. 4) is configured to validate the new commit node.

In some embodiments, validating the new commit node includes determining (710) a path from the new commit node to a node in the cached portion of the public record. In some embodiments, computing device 108 or a component thereof (e.g., path determination module 334, FIG. 3) is configured to determine a path (sometimes called an "authentication path") from the new commit node to a node in public record 362 (e.g., the cached portion of the public record). In some embodiments, trusted computer 112 or a component thereof (e.g., path determination module 430, FIG. 4) is configured to configured to determine an authentication path from the new commit node to a node in public record 462 (e.g., the cached portion of the public record).

In some embodiments, the authentication path goes from the genesis node to the new commit node or from a signed node indicating that all nodes above it have been validated to the new commit node. In another embodiment, the authentication path goes from a root node of the cached portion of the public record to the new commit node. For example, in FIG. 6, authentication path 610 includes the root node from the cached portion of public record 602 (e.g., node 604-5), new node 606, and new commit node 608.

In some embodiments, validating the new commit node also includes validating (712) every node, excluding the cached commit node, on the path, where validating a respective node on the path includes verifying the at least one representation of the cryptographic hash of one of the set of blobs corresponding to the respective node. In some embodiments, computing device 108 or a component thereof (e.g., first verification module 336, FIG. 3) is configured to verify the composed of link(s) of each node, excluding the cached node, in the authentication path. In some embodiments, trusted computer 112 or a component thereof (e.g., first verification module 432, FIG. 4) is configured to verify the composed of link(s) of each node, excluding the cached node, in the authentication path.

Alternatively, in some embodiments, verifying composed of link(s) of nodes is delayed until required during query evaluation. In other words, for partial/deferred verification, Step 712 (i.e., verifying composed of link(s)) is skipped and supersedes link(s) are verified in Step 714. As such, partial/deferred verification allows for greater scalability.

In one example, with reference to FIG. 5A, commit node 106-8 is a new commit node in the authentication path. In this example, first verification module 336, FIG. 3 is configured to verify composed of links 214 by running a hash algorithm on each of blobs A-D and comparing the results with the corresponding hash values in composed of links 214 in commit node 106-8. Thus, the contents of blobs A-D are required to fully verify composed of links 214 in commit node 106-8.

In another example, with reference to FIG. 5B, commit node 106-7 is a new commit node in the authentication path. In this example, first verification module 336, FIG. 3 is configured to verify composed of link 214 to a checksum of the contents of commit node 106-7. Continuing with this example, when starting with blob Z, verification module 336 is configured to verify the checksum in composed of link 214 by first running a hash algorithm on blob Z to generate hash value H7. Next, in this example, H7 is concatenated with its sibling node 512 (e.g., H6) and, in turn, the hash algorithm is run on (H6, H7) to generate hash value H3. Next, in this example, H3 is concatenated with its sibling node 514 (e.g., H2) and, in turn, the hash algorithm is run on (H2, H3) to generate hash value H1. Continuing with this example, hash value H1 is compared with the checksum in composed of link 214 in commit node 106-7. Thus, only the contents of blob Z and the checksums of one node per level of the binary tree representation are required to verify that blob Z is the 4th child of the binary tree in composed of link 214 of commit node 106-7.

In some embodiments, validating the new commit node further includes verifying (714) the at least one representation of the cryptographic hash of the parent node of the new commit node. In some embodiments, computing device 108 or a component thereof (e.g., second verification module 338, FIG. 3) is configured to verify the supersedes link(s) of the new commit node. In some embodiments, trusted computer 112 or a component thereof (e.g., second verification module 434, FIG. 4) is configured to verify the supersedes link(s) of the new commit node. For example, with reference to FIG. 5A, second verification module 338, verifies supersedes link 212 corresponding to new commit node 106-8's parent node 106-6 by running a hash algorithm on a representation of parent node 106-6 and comparing the result to the hash value in supersedes link 212.

In some embodiments, validating the new commit node additionally includes verifying (716) a signature condition. In some embodiments, computing device 108 or a component thereof (e.g., signature condition module 340, FIG. 3) is configured to verify that the new commit node satisfies a signature condition. In some embodiments, trusted computer 112 or a component thereof (e.g., signature condition module 436, FIG. 4) is configured to verify that the new commit node satisfies a signature condition. In some embodiments, the signature condition is satisfied when the author of the new commit node signs the new commit node and the author's digital signature is verified. In some embodiments, the signature condition is satisfied when the new commit node is signed by one or more authorities (e.g., when the new commit node makes critical changes). In some embodiments, the signature condition is satisfied when auditor 118 has signed the new commit node ensuring that the changes included in the new commit node are valid and do not include malicious code.

In one example, a commit that includes nodes representing adding or revoking a public key associated with an identifier, such as an email address, a phone number, or a personal identification number is not valid unless it is signed by an authority for the identity system (e.g., a domain owner, phone company, or national identity provider). The public keys for the relevant authority can be stored in the public record itself.

In another example, a commit that includes nodes representing adding or revoking a public key associated with a DNS address is not valid unless it is signed by an identity representing a certificate authority. In this example, the commit acts as an x509 SSL certificate, but with multiple additional benefits. First, when a client updates its public record, all public keys are updated. Thus, whether a public key exists for a web site is known to the client, which provides non-repudiation and prevention man-in-the-middle attacks that downgrade the connection to unencrypted mode. Second, man-in-the-middle attacks where the attacker has control over the signing key of the certificate authority requires committing a fake key into the public record, something that is easy to detect. Third, key revocation is efficient and immediate for all sites, also those not accessed by the client, unlike certificate revocation lists that can be slow to access and not scale properly. Fourth, much less trust is given to certificate authorities since the public record ensures that everyone has access to the same information, and thus anomalies are easy to spot and react to by third parties.

In some embodiments, validating the new commit node additionally includes determining (718) whether the new commit satisfies a set of global rules associated with the public record and a set private policies associated with a user of the electronic device. In some embodiments, computing device 108 or a component thereof (e.g., rule/policy condition module 342, FIG. 3) is configured to verify that the new commit node satisfies a set of global rules associated with the public record and a set of private policies associated with the user of the electronic device. In some embodiments, trusted computer 112 or a component thereof (e.g., rule condition module 438, FIG. 4) is configured to verify that the new commit node satisfies a set of global rules associated with the public record.

For example, the set of global rules associated with the public record, when seen as a persistent data structure representing a file hierarchy, can include access control lists (ACL) for parts of the data structure. For example, a commit node that is signed by a normal user will not be valid if it changes data items outside of its home directory. In another example, the set of global rules requires that a new node in a particular part of the data structure, such as an address book, or an email follows a specified form.

In another example, a commit that changes multiple nodes that represent a general ledger will not be valid unless the transaction balances. In another example, a part of the public record consists of large files that must be split up into chunks no larger than 1 MB. A commit with larger nodes will be invalid. In another example, a node represents a node in a B-tree and is required to conform to a specified format. In another example, x509 certificates can be added to a part of the public record where known issued x509 certificates are stored, provided that they are signed by one in a set of trusted certificate authorities stored in another part of the public record. In another example, a commit will not be valid unless a fee in the form of a transaction between a crypto currency account in the public record, and another account, is included in the commit. In another example, a commit including verification meta-data will not be valid unless backed by significant crypto currency insurance (e.g., bitcoins), so that the first who finds the meta-data to be invalid can claim the insurance money.

For example, the set of private policies associated with the user of the electronic device require a specified auditor or signature verifier to sign the new commit node before updating the cached version of the public record to include the new commit node. Thus, the cost of verification of the set of global rules can be offloaded to one or more trusted verifiers.

In some embodiments, a global rule is implemented as a script or program that is stored in the public record, and where the script or program has access to the public record, and where the script or program determines whether the rule holds.

In accordance with a determination that the new commit node is valid, the electronic device updates (720) the cached portion of the public record to include the new commit node. In some embodiments, computing device 108 or a component thereof (e.g., updating module 344, FIG. 3) is configured to update the cached portion of public record 362 to include the new commit node in accordance with a determination that the new commit node is valid. In some embodiments, trusted computer 112 or a component thereof (e.g., updating module 440, FIG. 4) is configured to update the cached portion of public record 462 to include the new commit node in accordance with a determination that the new commit node is valid. For example, with reference to FIG. 6, after verifying composed of link(s) of new node 606 and new commit node 608 in authentication path 610 and verifying the supersedes link(s) of new commit node 608, updating module 344 updates the cached portion of public record 602 to include new node 606 and new commit node 608.

In some embodiments, the electronic device determines (722) whether the new commit node is a root commit node, and in accordance with a determination that the new commit node is one of the one or more root commit nodes, updates the cached public record to include the new commit node as one of the one or more root commit nodes. For example, with reference to FIG. 6, the electronic device determines that new commit node 608 is a root node and no longer considers node 604-5 to be the root node of the public record. In some embodiments, more than one node in the public record is considered a root node.

In some embodiments, the electronic device is a trusted server, and the trusted computer (724): stores private data on behalf of a user, where the private data is associated with a data protection policy; in accordance with a determination that the new commit node is valid, determines whether the updated collection of data associated with the new commit node satisfies the data protection policy; and in accordance with a determination that the updated collection of data associated with the new commit node does not satisfy the data protection policy, initiates a security protocol. In some embodiments, trusted computer 112, as shown in FIG. 4, stores private data 466 for client devices 114 and trusted computer 112 stores a set of data protection policies 464 for each client device 114. For example, a set of data protection policies for private data associated with a first client device 114-1 is more conservative and cautionary than a set of data protection policies for private data associated with a second client device 114-2. For example, a set of data protection policies for private data associated with a client device 114 indicate that a security protocol as to the private data is to be initiated when the updated collection of data associated with the new commit node has not been audited (e.g., bugs may still exists in the new version of software associated with the updated collection of data), signed by signature verifier 120 verifying that the signature of the author of the new commit node and/or signed by a specific authority.

In some embodiments, trusted computer 112 or a component thereof (e.g., policy condition module 444, FIG. 4) is configured to determine whether the updated collection of data associated with the new commit node satisfies a set of data protection policies associated with a respective client device 114. In some embodiments, trusted computer 112 or a component thereof (e.g., security protocol module 446, FIG. 4) is configured to perform a security protocol as to private data 466 when the updated collection of data associated with the new commit node does not satisfy the data protection policies associated with the respective client device 114.

In some embodiments, initiating the security protocol includes deleting (726) the private data. In some embodiments, security protocol module 446 is configured to delete private data associated with respective client device 114 when the updated collection of data associated with the new commit node does not satisfy the set of data protection policies associated with respective client device 114.

In some embodiments, initiating the security protocol includes spreading (728) the private data to N devices. In some embodiments, security protocol module 446 is configured to spread private data associated with respective client device 114 to one or more other devices (e.g., other trusted computers 112 or computing devices 108) when the updated collection of data associated with the new commit node does not satisfy the set of data protection policies associated with respective client device 114. For example, t of the devices, where t≤N, need to cooperate at a later time to recover the private data.

In some embodiments, initiating the security protocol includes spreading a secret key (e.g., a user's private crypto key) to encrypted private data to N devices. For example, t of the devices, where t≤N, need to cooperate at a later time to recover the private data.

In some embodiments, the electronic device performs (730) a query over the updated collection of data. In some embodiments, computing device 108 or a component thereof (e.g., query module 346, FIG. 3) is configured to perform a query over the updated collection of data associated with the new commit node. In some embodiments, trusted computer 112 or a component thereof (e.g., query module 448, FIG. 4) is configured to perform a query over the updated collection of data associated with the new commit node. For example, the query includes retrieving a public key associated with a website, server, email address, or other communication means. In another example, the query includes determining a software version of a trusted computer for comparing against the measurement of the trusted computer's software obtained via remote attestation.

In some embodiments, evaluating the query includes verifying previously unverified nodes in the public record. In some embodiments, evaluating the query includes checking global rules and private policies. In some embodiments, if validation, checking global rules, or checking private policies fail during query evaluation, the electronic device will discard commit nodes from the public record and update root commit nodes so that no known invalid property is known to exist in the public record.

In some embodiments, the query includes (732) a query for portions of a program. For example, the updated collection of data associated with the new commit node includes portions of a program (e.g., a secure email client).

In some embodiments, the electronic device initiates (734) an operation that depends on the results of the query. In some embodiments, computing device 108 or a component thereof (e.g., performance module 348, FIG. 3) is configured to perform an operation or cause an operation to be performed based on the result of the query. In some embodiments, trusted computer 112 or a component thereof (e.g., performance module 450, FIG. 4) is configured to perform an operation or cause an operation to be performed based on the result of the query. For example, the operation includes communicating with the website, server, or email address after validating the public key. In another example, determining that the trusted computer is secure after performing remote attestation.

In some embodiments, the operation also includes creating (736) a commit node in the public record. For example, when the updated collection of data associated with the new commit node includes portions of a program (e.g., a secure email client), trusted computer 112 compiles source code for the secure email client from the public record. Subsequently, in this example, trusted computer 112 writes the result (e.g., the compiled software version) to the public record. In another example, the collection of data associated with the new commit node indicates that all commit nodes above the new commit node up to the genesis node in the public record have been checked or signed and are secure.

In some embodiments, the operation includes executing (738) the program (e.g., a library, plugin, or script) in an environment. For example, when the updated collection of data associated with the new commit node includes portions of a program (e.g., a secure email client), performance module 348 is configured to compile the portions of the program and execute the program.

In some embodiments, the environment is (740) a trusted environment supporting a method of remote attestation. For example, trusted computer 112 or a component thereof (e.g., performance module 450, FIG. 4) performs the operation or causes the operation to be performed. In some embodiments, trusted computer 112 or a component thereof (e.g., attestation module 452, FIG. 4) is configured to respond to a remote attestation challenge or request from an associated client device 114 by providing measurements of the service being provided to client device 114 (e.g., including the kernel, operating system, software version, and/or the like of trusted computer 112).

In some embodiments, the measurements can be compared to known "good" measurements in the public record such as known "good" kernel binaries. In some embodiments, the measurements prove which state the public record was in, as seen by the environment, when the measurements were taken. For example, a PCR register, available on many computers implementing Trusted Computing Group (TCG) standards, can be extended with data that includes one or more roots of the public record.

In some embodiments, the attestation can happen between environments running on the same hardware. For example, when using Intel Secure Guard Extensions (Intel SGX) local attestation, attestation can happen between two containers, called enclaves. In some embodiments, Intel SGX remote attestation is used. In some embodiments, ARM TrustZone enables the trusted environment.

It will be understood that, although the terms "first," "second," etc. may be used herein to describe various elements, these elements should not be limited by these terms. These terms are only used to distinguish one element from another.

For example, a first hash value could be termed a second hash value, and, similarly, a second hash value could be termed a first hash value, without changing the meaning of the description, so long as all occurrences of the "first hash value" are renamed consistently and all occurrences of the "second hash value" are renamed consistently. The first hash value and the second hash value are both hash values, but they are not the same hash value.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of providing transparent trusted computing, comprising:
    at an electronic device with one or more processors and memory:
        obtaining all or a portion of the public record that includes a plurality of nodes in a directed-acyclic graph, the plurality of nodes includes a plurality of commit nodes, wherein a respective commit node of the plurality of commit nodes includes:
            (i) a set of blobs corresponding to a collection of data;
            (ii) at least one representation of a cryptographic hash of one of the set of blobs; and
            (iii) at least one additional representation of a cryptographic hash of a parent node;
        caching one or more nodes of the public record;
        obtaining, at a time after obtaining the all or the portion of the public record, information corresponding to a new commit node, wherein:
            the new commit node includes at least one representation of a cryptographic hash of a parent node of the new commit node; and the new commit node is associated with an updated collection of data;
validating the new commit node; and
in accordance with a determination that the new commit node is valid, updating the cached portion of the public record to include the new commit node.

2. The method of claim 1, wherein the plurality of nodes include in the directed-acyclic graph further includes one or more data-only nodes, wherein a respective data-only node of the one or more data-only nodes includes:
 (i) one or more blobs corresponding to a collection of data;
 (ii) at least one representation of a cryptographic hash of one of the one or more blobs; and
 (iii) not a representation of a cryptographic hash of a parent node.

3. The method of claim 1, wherein an edge of the directed-acyclic graph from a first node to a second node includes a representation of a cryptographic hash of the second node in a cryptographic hash of the first node.

4. The method of claim 1, wherein one or more blobs in the set of blobs are associated with another commit node other than the respective commit node.

5. The method of claim 1, wherein one or more of the plurality of commit nodes are root nodes, the method further comprising:
 determining whether the new commit node is a root commit node; and
 in accordance with a determination that the new commit node is one of the one or more root commit nodes, updating the cached public record to include the new commit node as one of the one or more root commit nodes.

6. The method of claim 1, wherein validating the new commit node includes:
 determining a path from the new commit node to a node in the cached portion of the public record;
 validating every node, excluding the cached commit node, on the path, wherein validating a respective node on the path includes verifying the at least one representation of the cryptographic hash of one of the set of blobs corresponding to the respective node; and
 verifying the representation of the cryptographic hash of the parent node of the new commit node.

7. The method of claim 1, wherein validating the new commit node includes verifying a signature condition.

8. The method of claim 1, wherein validating the new commit node includes determining whether the new commit satisfies a set of global rules associated with the public record and a set private policies associated with a user of the electronic device.

9. The method of claim 1, further comprising:
 performing a query over the updated collection of data; and
 initiating an operation that depends on the results of the query.

10. The method of claim 9, wherein the operation also includes creating a commit node in the public record.

11. The method of claim 9, wherein:
 the query includes a query for portions of a program; and
 the operation includes executing the program in an environment.

12. The method of claim 11, wherein the environment is a trusted environment supporting a method of remote attestation.

13. The method of claim 1, wherein the electronic device is a trusted computer, the method further comprising:
 storing private data on behalf of a user, wherein the private data is associated with a data protection policy;
 in accordance with a determination that the new commit node is valid, determining whether the updated collection of data associated with the new commit node satisfies the data protection policy; and
 in accordance with a determination that the updated collection of data associated with the new commit node does not satisfy the data protection policy, initiating a security protocol.

14. The method of claim 13, wherein initiating the security protocol includes deleting the private data.

15. An electronic device, comprising:
 one or more processors; and
 memory storing one or more programs to be executed by the one or more processors, the one or more programs comprising instructions for:
  obtaining all or a portion of the public record that includes a plurality of nodes in a directed-acyclic graph, the plurality of nodes include a plurality of commit nodes, wherein a respective commit node of the plurality of commit nodes includes:
   (i) a set of blobs corresponding to a collection of data;
   (ii) at least one representation of a cryptographic hash of one of the set of blobs; and
   (iii) at least one additional representation of a cryptographic hash of a parent node;
  caching one or more nodes of the portion of the public record;
  obtaining, at a time after obtaining the all or the portion of the public record, information corresponding to a new commit node, wherein:
   the new commit node includes at least one representation of a cryptographic hash of a parent node of the new commit node; and
   the new commit node is associated with an updated collection of data;
  validating the new commit node; and
  in accordance with a determination that the new commit node is valid, updating the cached portion of the public record to include the new commit node.

16. A non-transitory computer readable storage medium storing one or more programs, the one or more programs comprising instructions, which, when executed by an electronic device with one or more processors, cause the electronic device to perform operations comprising:
 obtaining all or a portion of the public record that includes a plurality of nodes in a directed-acyclic graph, the plurality of nodes include a plurality of commit nodes, wherein a respective commit node of the plurality of commit nodes includes:
  (i) a set of blobs corresponding to a collection of data;
  (ii) at least one representation of a cryptographic hash of one of the set of blobs; and
  (iii) at least one additional representation of a cryptographic hash of a parent node;
 caching one or more nodes of the portion of the public record;
 obtaining, at a time after obtaining the all or the portion of the public record, information corresponding to a new commit node, wherein:
  the new commit node includes at least one representation of a cryptographic hash of a parent node of the new commit node; and
  the new commit node is associated with an updated collection of data;
 validating the new commit node; and in accordance with a determination that the new commit node is valid, updating the cached portion of the public record to include the new commit node.

* * * * *